April 14, 1953        O. R. SMITH        2,634,633
ANNULAR SEGMENTAL WELDING HEAD Filed Feb. 10, 1948        2 SHEETS—SHEET 1

Inventor
Oliver R. Smith
By
E. V. Hardway,
ATTORNEY.

April 14, 1953
O. R. SMITH
2,634,633
ANNULAR SEGMENTAL WELDING HEAD
Filed Feb. 10, 1948
2 SHEETS—SHEET 2
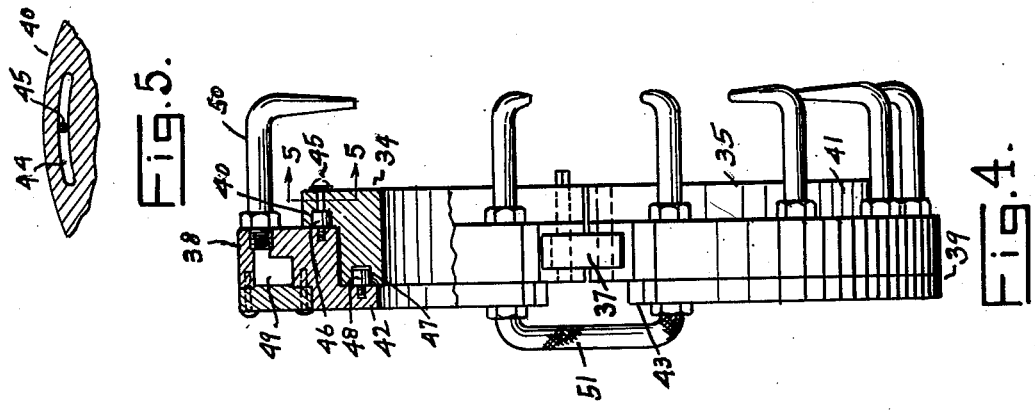
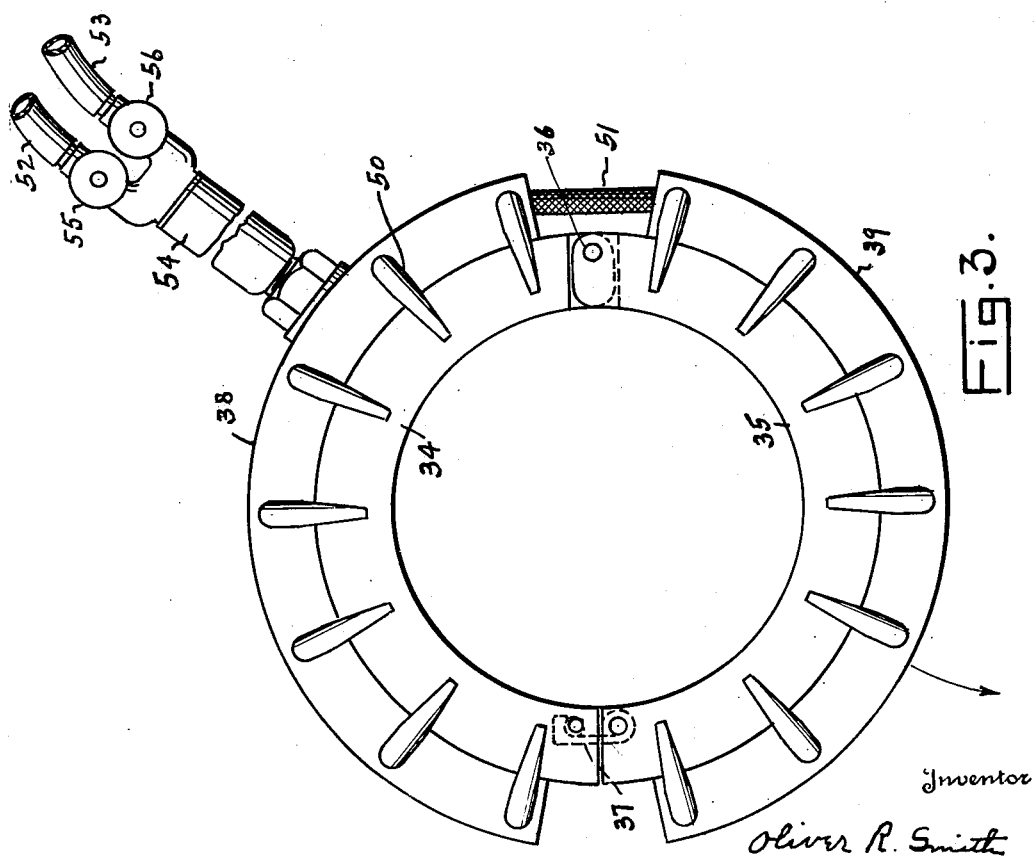
Inventor
Oliver R. Smith
By
E. V. Hardway
ATTORNEY Patented Apr. 14, 1953

2,634,633

UNITED STATES PATENT OFFICE 2,634,633

ANNULAR SEGMENTAL WELDING HEAD

Oliver R. Smith, Fort Worth, Tex.

Application February 10, 1948, Serial No. 7,309

2 Claims. (Cl. 78—84)

This invention relates to an annular segmental welding head.

An object of the invention is to provide a welding head of the character described shaped to surround pipe or cylindrical objects and specially adapted for welding together the abutting ends of pipe in the construction of a pipe line.

The welding head is illustrated for use in connection with pipe welding machine of substantially the same construction as that type of welding machine illustrated in my co-pending application for Pipe Welding Machine filed in the United States Patent Office on September 29, 1944, under Serial No. 556,448, now Patent No. 2,501,242.

It is another object of the present invention to provide a welding head of the character described which is formed of sections which may be readily latched around, or removed from, the pipe and which is equipped with annularly arranged inwardly directed nozzles for projecting flames against the abutting pipe ends to be welded together.

A further object of the present invention is to provide a welding head which includes a clamp ring to surround and to be clamped to the pipe with a gas distributing ring mounted on the clamp ring in such manner that the distributing ring may be oscillated circumferentially of the clamp ring, said distributing ring containing chambers with which the nozzles communicate and which, in turn, are in communication with a source of fuel supply.

The gas distributing ring is formed of sections so that it will open and close with the clamp ring, the gas chambers of said sections being connected by a flexible hose, preferably formed of metal.

Other objects and advantages will be apparent from the following specification which is illustrated by the accompanying drawings, wherein:

Figure 3 is an elevational view of the welding head.

Figure 4 is a side elevation thereof partly in section, and

Figure 5 is a fragmentary sectional view taken on the line 5—5 of Figure 4.

Figure 1:
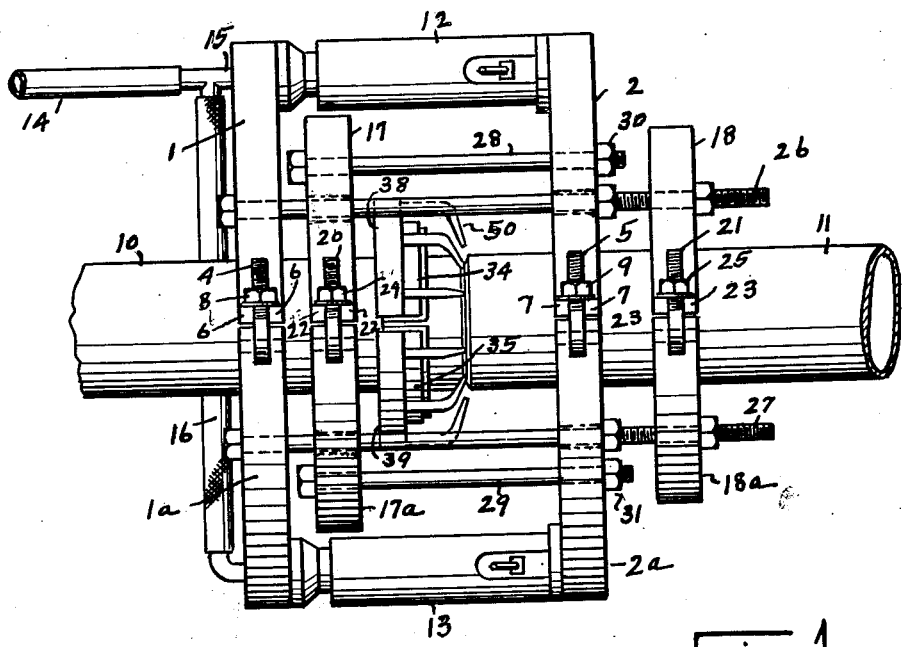
Figure 1 is a elevational view of a pipe welding machine showing the welding head mounted for use in connection therewith.
Figure 2:
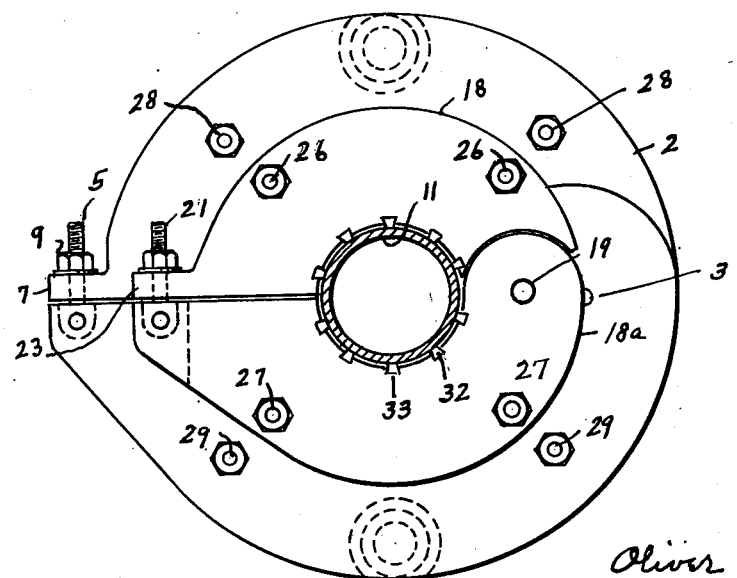
Figure 2 is an end view thereof clamped about a pipe.

Referring now more particularly to the drawings wherein like numerals of reference designate the same parts in each of the figures, the numerals 1, 1a and 2, 2a designate the complemental sections, respectively, of the frame members of the welding machine. The sections 1, 1a and complemental sections 2, 2a are pivoted together, at one end, on a pivot pin, as 3. These respective complemental sections are of general arcuate shape and at their other ends that may be latched together around the pipe by similar latch bolts, as 4 and 5, which, as shown, are pivoted to the sections 1a, 2a and may be fitted between spaced lugs 6, 6 and 7, 7 on the corresponding ends of the sections 1, 2 and secured in latched position by nuts 8 and 9 threaded onto the ends of said latch bolts.

These frame members surround the adjacent ends of the respective pipe sections to be welded together. In the present illustration these sections are designated by the numerals 10 and 11 and preferably their ends will be beveled, as shown in Figure 1. The inside diameter of these frame members is somewhat greater than the outside diameter of the pipe sections which they surround so that said pipe sections may readily move therethrough.

Mounted between the frame members are the jacks 12, 13 comprising cylinders attached to one of the frame members with pistons therein having piston rods whose outer ends may be connected to the other frame member, as illustrated in the co-pending application above referred to. Fluid may be introduced into the cylinders from any suitable source of pressure through the supply line 14 and the branch lines 15, 16 to force the frame members apart and said pressure may be relieved in any conventional manner to allow said frame members to move toward each other.

There are the pipe clamps comprising the complemental sections 17, 17a and 18, 18a. These sections are arcuate in shape and are pivoted together, at one end, on the pivots, as 19, and may be latched together at their other ends by the latch bolts 20, 21 which are pivoted to the sections 17a, 18a, respectively, and are adapted to fit between spaced lugs 22, 22 and 23, 23 carried by the corresponding sections 17 and 18. They may be secured in closed position by means of the nuts 24, 25 threaded onto the latch bolts 20, 21. The clamps 17, 17a and 18, 18a are arranged on opposite sides of the frame members 2, 2a. The sections 1 and 18 are connected by the bolts 26, 26 and the sections 1a, 18a are connected by the bolts 27, 27. These bolts pass loosely through enlarged openings in the sections 17, 2 and 17a, 2a, respectively, so that they will not bind when the machine is unlatched and swung open.

The sections of the frame members 2, 2a are connected to the corresponding sections of the clamp members 17, 17a by bolts 28, 28 and 29, 29 which have enlarged heads to engage the sections 17, 17a and are threaded, at their other ends, to receive retaining nuts, such as 30, 31.

From the foregoing it is apparent that as the frame members are forced apart, by the hydraulic jacks, the clamp members will be drawn together. These clamp members engage the corresponding pipe sections 11 and 12 and force their ends together under constant pressure while the heat is being applied.

Dovetailed into the respective sections 17, 17a and 18, 18a of the clamps are the pipe gripping jaws 32 whose inner surface may be knurled or roughened so as to engage the corresponding pipe; also their outer faces are tapered and contact with the co-acting tapering faces 33, of the clamps 17, 17a and 18, 18a so that as the clamps are drawn together the jaws 32 will be forced inwardly into secure engagement with the corresponding pipe as fully explained and shown in said co-pending application.

When the pressure is relieved in the jack cylinders 12, 13 the pull on the clamps will be relieved so that they may be readily released from the pipe.

In order to heat the adjacent ends of the pipe to fusion point the welding head, shown in Figures 3 and 4 has been provided. This head includes the sections 34, 35 of a clamp ring, said sections being arcuate and hinged together, at one end, by the hinge 36 and latched together, at their other ends, by any conventional type of releasable latch, as 37.

Around, and mounted on, this clamp ring there is a gas distributing ring formed of arcuate sections 38 and 39 whose ends are spaced a distance apart. The forward end of the clamp ring sections are formed with external arcuate flanges 40, 41 against which the corresponding sections 38, 39 of the distributing ring abut and the outer, or rear end of the distributing ring is formed with inwardly directed flanges 42, 43 which abut the rear, or outer end of the corresponding clamp ring sections 34, 35. The flanges 40, 41 have arcuate slots 44 therethrough, concentric with said clamp ring and bolts, as 45, extend through said slots and their inner ends are threaded into the corresponding sections of the distributing ring and on these bolts in suitable grooves in the clamp ring sections are the roller bearings, as 46, so that the distributing ring may be turned back and forth a distance equal to the length of the slots 44. These bolts 45 maintain the clamp ring and distributing ring in assembled relation. Also the clamp sections 34, 35 have arcuate bearings 47 therein equal in length to the slots 44 and mounted on the corresponding sections of the distributing ring there are the rollers 48 which run in said bearings so that the distributing ring may be readily oscillated back and forth. Each section of the distributing ring is formed with an arcuate gas chamber 49 and screwed into said sections are the nozzles 50 whose free ends are inwardly turned. These inwardly turned ends of the nozzles are directed toward the center of the head and are substantially of equal length so that they will be spaced equally from the joint to be welded, as shown in Figures 1 and 3.

As the ends of the pipe sections 10, 11 are pulled together by the welding machine above described fuel may be admitted to one of the chambers 49 and thence to the other chamber through a flexible metal hose 51 connecting said chambers and forming a hinge by means of which the sections 38, 39 may be opened and closed as the sections 34 and 35 are opened and closed.

The gas admitted to the chambers 49 will be discharged through the nozzles 50 and when ignited will cast a flame against the adjacent pipe ends while they are being pulled together by the machine and in order that the weld may be uniform all the way around the distributing ring may be oscillated back and forth.

The fuel may be admitted through the lines 52, 53 to a common connection 54, which forms a handle for oscillating the distributing ring, and thence into the chamber 49.

The lines 52, 53 are controlled by suitable valves 55, 56 by means of which the fuel mixture may be regulated.

The drawings and description disclose what is now considered to be a preferred form of the invention by way of illustration only while the broad principle of the invention will be defined by the appended claims.

What I claim is:

1. An annular welding head comprising, a clamp ring formed of sections hinged together at one end and whose other ends are connected by a releasable latch so that the clamp ring may be closed and secured about a pipe or opened, each of said clamp ring sections having an external radially extending flange, a distributing ring formed of sections mounted for circumferential oscillating movement relative to the respective sections of the clamp ring in laterally abutting relation with said external flanges, each of said distributing ring sections having an inwardly radially extending flange positioned in laterally abutting relation with a radially extending face of the corresponding section of the clamp ring, the sections of the distributing ring having internal chambers and a flexible hose connecting said chambers, nozzles on the respective sections of the distributing ring connected into the corresponding chambers and whose free ends are directed toward the pipe surrounded by the head, a fuel inlet connection through which fuel is admitted into one of said chambers, said connection forming a handle, one of said rings having a circumferentially extending slot, means on the other of said rings engageable in said slot to limit circumferential movement of said distributing ring relative to said clamping ring.

2. An annular welding head comprising, a clamp ring formed of sections hinged together at one end and whose other ends are connected by a releasable latch so that the clamping ring may be closed and secured about a pipe or opened, each of said clamp ring sections having an external radially extending flange, a distributing ring formed of sections positioned on the respective sections of the clamp ring in laterally abutting relation with said external flanges, each of said distributing ring sections having an inwardly radially extending flange positioned in laterally abutting relation with a radially extending face of the corresponding section of the clamp ring, one of said rings having a circumferential groove therein and bearing means in the groove and supporting said distributing ring for circumferential oscillating movement on the clamp ring, the sections of the distributing ring having internal chambers and a flexible hose connecting said chambers, nozzles on the respective sections of the distributing ring connected into the corresponding chambers and whose free ends are directed toward the pipe surrounded by the head, a fuel inlet connection through which fuel is admitted into one of said chambers, said connection forming a handle, one of said rings having a circumferentially extending slot, and a connecting member extending through said slot and connected to the other of said rings, said member being engageable with the ends of said slot to limit circumferential movement of said distributing ring on said clamping ring.

OLIVER R. SMITH.

References Cited in the file of this patent

UNITED STATES PATENTS

| Number | Name | Date |
|---|---|---|
| 1,316,190 | Sackerman | Sept. 16, 1919 |
| 1,359,128 | Trost | Nov. 16, 1920 |
| 1,775,311 | Halle | Sept. 9, 1930 |
| 2,047,305 | Bell | July 14, 1936 |
| 2,061,287 | Muehl | Nov. 17, 1936 |
| 2,214,031 | Rockefeller | Sept. 10, 1940 |
| 2,252,320 | Hughey | Aug. 12, 1941 |
| 2,435,702 | Vallee | Feb. 10, 1948 |